(12) United States Patent
Guo (10) Patent No.: US 11,930,472 B2
(45) Date of Patent: Mar. 12, 2024

(54) TARGET INFORMATION ACQUISITION METHOD AND TERMINAL DEVICE

(71) Applicant: GUANGDONG OPPO MOBILE TELECOMMUNICATIONS CORP., LTD., Guangdong (CN)

(72) Inventor: Yali Guo, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 18/325,676

(22) Filed: May 30, 2023

(65) Prior Publication Data
US 2023/0300772 A1 Sep. 21, 2023

Related U.S. Application Data

(63) Continuation of application No. PCT/CN2020/136206, filed on Dec. 14, 2020.

(51) Int. Cl.
H04W 60/00 (2009.01)
H04L 67/141 (2022.01)
H04W 12/06 (2021.01)

(52) U.S. Cl.
CPC .......... *H04W 60/00* (2013.01); *H04L 67/141* (2013.01); *H04W 12/06* (2013.01)

(58) Field of Classification Search
CPC ..... H04W 12/06; H04W 60/00; H04W 12/10; H04W 76/10; H04L 67/141
See application file for complete search history.

(56) References Cited

U.S. PATENT DOCUMENTS

| 11,197,147 B2* | 12/2021 | Hong | H04W 48/02 |
| 11,212,856 B2* | 12/2021 | Hong | H04W 48/02 |
| 11,665,598 B2* | 5/2023 | Zhang | H04W 36/0027 370/331 |

(Continued)

FOREIGN PATENT DOCUMENTS

| CN | 109302428 A | 2/2019 |
| CN | 111436050 A | 7/2020 |

(Continued)

OTHER PUBLICATIONS

3GPP TR 23.754 V1.2.0 (Nov. 2020), 3rd Generation Partnership Project; Technical Specification Group Services and System Aspects; Study on supporting Unmanned Aerial Systems (UAS) connectivity, Identification and tracking (Release 17).
Lechoslaw Tomazewski et al., "Integration of U-space and 5GS for UAV services," 2020 IFIP Networking Conference (Networking), Jul. 17, 2020 (6 pages).

(Continued)

*Primary Examiner* — Khawar Iqbal
(74) *Attorney, Agent, or Firm* — Ladas & Parry, LLP (57) ABSTRACT

A target information acquisition method and a terminal device are provided. The method includes transmitting an information-acquisition request to a terminal device, the information-acquisition request indicating the terminal device to transmit target information; receiving the target information transmitted by the terminal device; and transmitting the target information to a management device of the terminal device, the management device authenticating or authorizing the terminal device according to the target information.

17 Claims, 7 Drawing Sheets

(56) References Cited

U.S. PATENT DOCUMENTS

| | | | | |
|---|---|---|---|---|
| 11,758,499 | B2* | 9/2023 | Ryu | H04W 12/082 370/329 |
| 11,805,559 | B2* | 10/2023 | Dou | H04W 80/10 |
| 2020/0205211 | A1* | 6/2020 | Hong | B64C 39/024 |
| 2020/0336901 | A1 | 10/2020 | Zhu et al. | |
| 2022/0277657 | A1* | 9/2022 | Xiang | H04W 12/68 |
| 2022/0369363 | A1* | 11/2022 | Ferdi | B64C 39/024 |
| 2022/0377545 | A1* | 11/2022 | Wang | H04W 4/44 |
| 2023/0102300 | A1* | 3/2023 | Faccin | G08G 5/0078 455/435.1 |
| 2023/0133187 | A1* | 5/2023 | Ferdi | H04W 12/068 455/411 |
| 2023/0319622 | A1* | 10/2023 | Li | H04M 15/66 370/329 |
| 2023/0354463 | A1* | 11/2023 | Talebi | H04W 76/27 |

FOREIGN PATENT DOCUMENTS

| | | |
|---|---|---|
| CN | 111818481 A | 10/2020 |
| WO | 2022/126329 A1 | 6/2022 |

OTHER PUBLICATIONS

International search report from International Application No. PCT/CN2020/136206, dated Sep. 13, 2021.

Written Opinion of the International Searching Authority in International Application No. PCT/CN2020/136206, dated Sep. 13, 2021, with machine translation provided by WIPO.

"3rd Generation Partnership Project; Technical Specification Group Services and System Aspects; Study on security aspects of Unmanned Aerial Systems (UAS) (Release 17)"3GPP Draft; S3-203467, 3rd Generation Partnership Project (3GPP), Mobile Competence Centre; 650, Route Des Lucioles; F-06921 Sophia-Antipolis Cedex; France, Nov. 20, 2020, XP051956946 (40 pages).

"3rd Generation Partnership Project; Technical Specification Group Services and System Aspects; Procedures for the 5G System (5GS); Stage 2 (Release 16)", 3GPP Standard; 3GPP TS 23.502, 3rd Generation Partnership Project (3GPP), Mobile Competence Centre; 650, Route Des Lucioles; F-06921 Sophia-Antipolis Cedex; France, vol. SA WG2, No. V16.6.0 Sep. 24, 2020, XP051960894 (597 pages).

European Search Report from corresponding European Patent Application No. 20965347.6, dated Nov. 17, 2023 (11 pages).

* cited by examiner

TARGET INFORMATION ACQUISITION METHOD AND TERMINAL DEVICE

CROSS REFERENCE TO RELATED APPLICATIONS

The present disclosure is a continuation application of International (PCT) Patent Application No. PCT/CN2020/136206 filed on Dec. 14, 2020, the disclosure of which is herein incorporated by reference in its entirety.

TECHNICAL FIELD

The present disclosure relates to the field of mobile communication, in particular to a target information acquisition method and a terminal device.

BACKGROUND

At present, with rapid development of mobile communication technology and wide application of terminal devices, a terminal device can access a mobile communication network and transmit target information to a management device of an unmanned aerial vehicle through a network device in the mobile communication network. The management device authenticates or authorizes the terminal device based on the target information transmitted by the unmanned aerial vehicle, etc.

When communicating with the management device, the terminal device does not know configuration of the network device. In a registration process, a session establishment process and a session modification process, the terminal device actively transmits the target information to the network device, resulting in repeated transmission of the target information, thereby occupying large resources of the mobile communication network and causing waste of resources.

SUMMARY

A target information acquisition method in network device is provided according to an aspect of the present disclosure, and includes:
transmitting an information-acquisition request to a terminal device, the information-acquisition request indicating the terminal device to transmit target information; receiving the target information transmitted by the terminal device; and transmitting the target information to a management device of the terminal device, the management device authenticating or authorizing the terminal device according to the target information.

A target information transmission method in a terminal device is provided according to another aspect of the present disclosure, and includes:
receiving an information-acquisition request transmitted by a network device, the information-acquisition request indicating the terminal device to transmit target information of the terminal device, and the target information authenticating or authorizing the terminal device; and transmitting the target information to the network device based on the information-acquisition request.

A terminal device is provided according to an aspect of the present disclosure, and includes:
a processor;
a transceiver, connected to the processor;
a memory, configured to store a program code executed by the processor;
the processor is configured to load and execute the program code to implement any one of the target information transmission methods mentioned above.

BRIEF DESCRIPTION OF THE DRAWINGS

In order to make the technical solution described in embodiments of the present disclosure more clearly, the drawings used for the description of the embodiments or background will be described. Apparently, the drawings in the following description are only some embodiments of the present disclosure. For those skilled in the art, other drawings may be acquired according to the drawings without any creative work.

DETAILED DESCRIPTION

In order to make the purpose, technical solution and effect of the present disclosure clearer, embodiments of the present disclosure will be further described in detail below in combination with the drawings.

It is understood that the terms "first", "second" and the like used in the present disclosure can be configured to describe various concepts herein, but unless otherwise specified, these concepts are not limited by these terms. These terms are only configured to distinguish one concept from another.

Embodiments of the present disclosure are applied in a scenario where an unmanned aerial vehicle device communicates with an unmanned aerial system traffic management (UTM) or an unmanned aircraft system (UAS) service supplier (USS) through a mobile communication network. The unmanned aerial vehicle device may access the mobile communication network and establish connection with the UTM or the USS. The UTM or the USS is configured for registration, location tracking or control of the unmanned aerial vehicle device. In addition, after the unmanned aerial vehicle device accesses the mobile communication network, it may also establish connection with a controller of the unmanned aerial vehicle device through the mobile communication network, such that the controller of the unmanned aerial vehicle device may control the unmanned aerial vehicle device.

Figure 1:
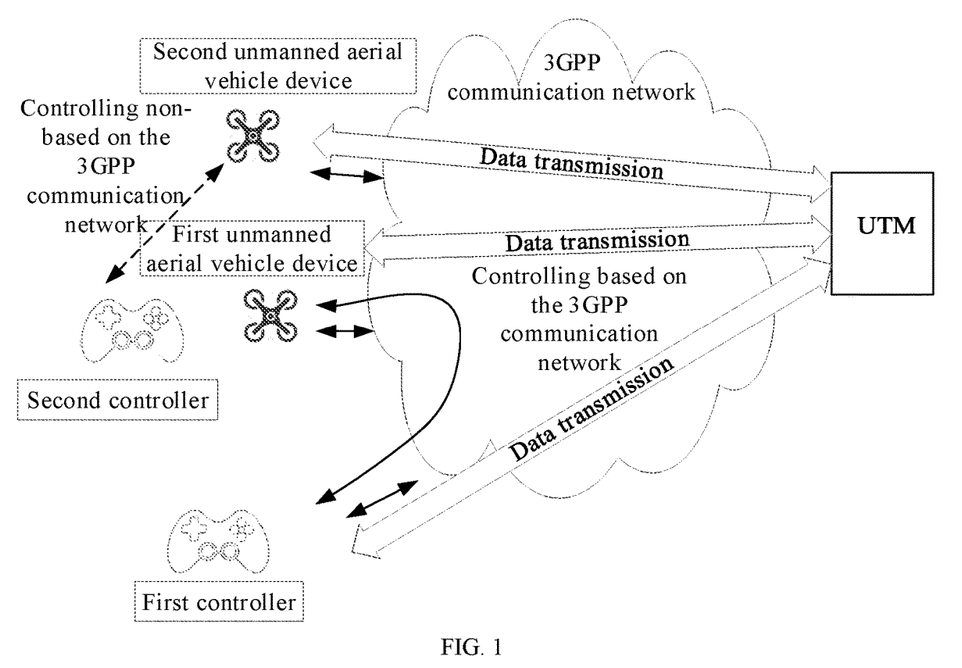
FIG. 1 is a communication structural diagram between an unmanned aerial vehicle device and an unmanned aerial system traffic management (UTM) according to some exemplary embodiments of the present disclosure.

For example, as shown in FIG. 1, both a first unmanned aerial vehicle device and a second unmanned aerial vehicle device are connected to the UTM through a 3GPP (Third Generation Partnership Project) communication network, such that data transmission between the unmanned aerial vehicle devices and the UTM may be performed through the 3GPP communication network. Data transmission between a first controller of the first unmanned aerial vehicle device and the UTM may also be performed through the 3GPP communication network, and the first controller may control the first unmanned aerial vehicle device based on the 3GPP communication network. A second controller of the second unmanned aerial vehicle device may directly control the second unmanned aerial vehicle device without controlling the second unmanned aerial vehicle device based on the 3GPP communication network.

Figure 2:
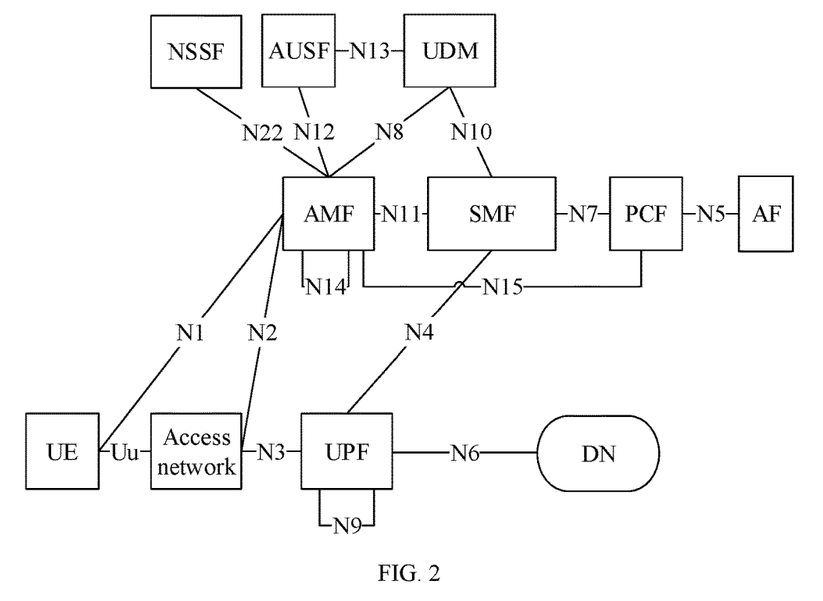
FIG. 2 is an architecture diagram of a 5G network system according to some exemplary embodiments of the present disclosure.

In some embodiments, the 3GPP communication network is a 5G communication network. A 5G network system architecture is shown in FIG. 2. A terminal device establishes access stratum connection with an access network through an Uu interface (a communication interface), and then transmits an access stratum message and performs wireless data transmission through the access network. In addition, the terminal device establishes non-access stratum connection with a network element for access and mobility management function (AMF) through the N1 interface (a communication interface), and a non-access stratum messages are transmitted between the terminal device and the network element for AMF. A UDM (Unified Data Management) is a signing database in a core network, which is configured to store signing data of the terminal device in the 5G network. The network element for AMF has a mobility management function and a forwarding function for session management messages. A network element for session management function (SMF) has a session management function. A network element for policy control function (PCF) has a policy management function, which is configured to formulate policies related to mobility management, session management, billing and the like for terminal devices. A network element for user plane function (UPF) has a user plane function, data transmission between the network element for UPF and an external data network may be performed through a N6 interface, and data transmission between the network element for UPF and the core network may be performed through a N3 (a communication interface) interface. After the terminal device accesses the 5G network through the Uu interface, the protocol data unit (PDU) session data connection between the terminal device and the UPF is established under the control of the SMF, so as to perform data transmission. A network element for network slice selection function (NSSF) is configured to select network slices. A network element for authentication server function (AUSF) has an authentication function.

In some embodiments, the access network includes several base stations which are devices deployed in the access network to provide wireless communication functions for terminal devices. The base stations may include various forms, such as a macro base station, a micro base station, a relay station, and an access point, etc. In systems with different wireless access technologies, names of devices with functions of a base station may be different. For example, the base station is called as eNodeB or eNB in an LTE system, and called as gNodeB or gNB in a 5G NR-U system. With development of communication technologies, a definition of the "base station" may change.

The terminal device may include various devices with wireless communication functions, such as a handheld device, an on-board device, a wearable device, a computing device, other processing device connected to wireless modems, various forms of user devices, a mobile station (MS), or an unmanned aerial vehicle device, etc. For convenience of description, the device mentioned above are collectively referred to as terminal devices.

Figure 3:
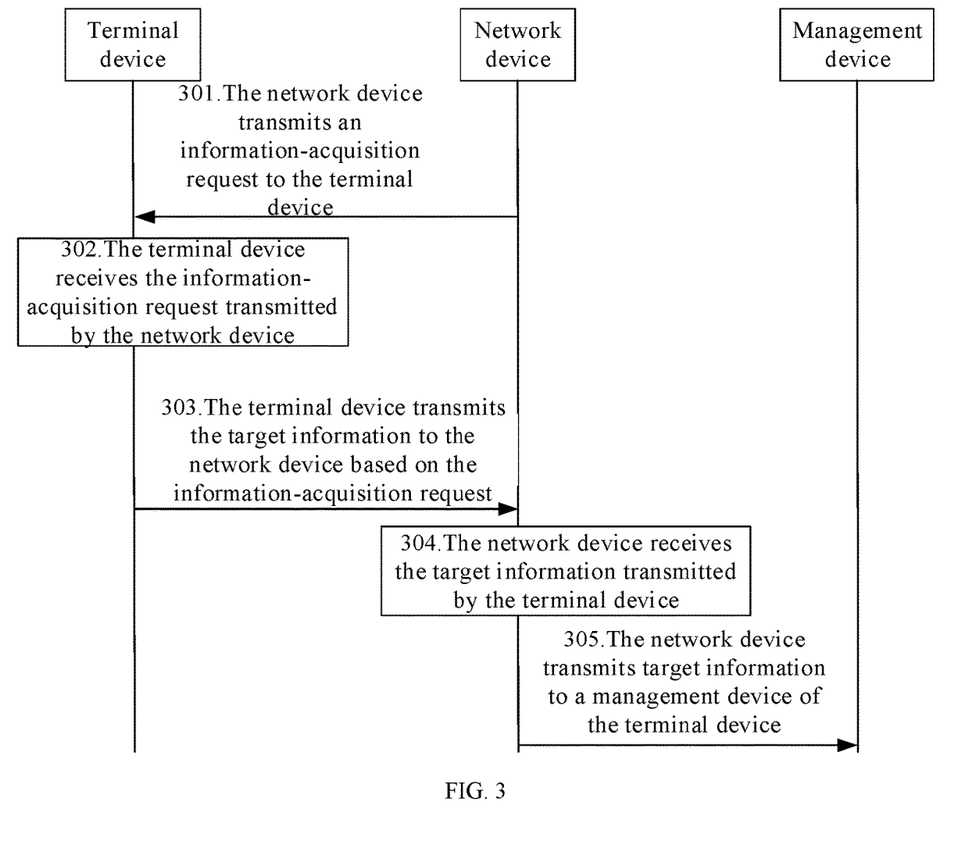
FIG. 3 is flowchart of a target information acquisition method according to some exemplary embodiments of the present disclosure.

FIG. 3 is flowchart of a target information acquisition method according to some exemplary embodiments of the present disclosure, which is applied in a network device and a terminal device, and includes at least a part of following contents.

At operation 301, the network device transmits an information-acquisition request to the terminal device.

In embodiments of the present disclosure, in a case where the terminal device is connected to a management device of the terminal device through the network device, the network device needs to determine an authorization result or an authentication result between the terminal device and the management device to determine whether the terminal device is a legal device, and provide service and control functions for the terminal device when the terminal device is determined to be legal.

When the network device determines that it needs to authenticate or authorize the terminal device, the network device transmits the information-acquisition request to the terminal device to indicate the terminal device to transmit target information to the network device based on the information-acquisition request.

It should be noted that, that the network device transmitting the information-acquisition request to the terminal device is taken as an example in embodiments of the present disclosure to illustrate. In another embodiment, the network device needs to determine whether to transmit the information-acquisition request to the terminal device according to a request transmitted by the terminal device.

In some embodiments, the network device transmits the information-acquisition request to the terminal device according to a registration request transmitted by the terminal device.

In a first manner, the network device transmits the information-acquisition request to the terminal device each time it receives the registration request transmitted by the terminal device.

The terminal device transmits the registration request to the network device to request registration. After receiving the registration request, the network device may determine to perform authentication or authorization on the terminal device. Each time receives the registration request transmitted by the terminal device, the network device will transmit the information-acquisition request to the terminal device. The registration request is configured to indicate the terminal device to register with the network device.

In embodiments of the present disclosure, the network device acquires the target information of the terminal device each time it receives the registration request transmitted by the terminal device, ensuring that the network device may authenticate or authorize the terminal device each time, and improving security of communication with the terminal device.

In a second manner, after the network device receives the registration request transmitted by the terminal device for the first time, it transmits the information-acquisition request to the terminal device.

In embodiments of the present disclosure, the terminal device transmits the registration request to the network device for many times, and the network device transmits the information-acquisition request to the terminal device after receiving the registration request transmitted by the terminal device for the first time. Subsequently, when the terminal device retransmits the registration request, the network device does not need to retransmit the information-acquisition request to the terminal device to acquire the target information of the terminal device.

In embodiments of the present disclosure, after the network device receives the registration request transmitted by the terminal device for the first time, it transmits the information-acquisition request to acquire the target information of the terminal device, and subsequently authorizes or authenticates the terminal device. When the network device receives the registration request of the terminal device again, it does not need to authorize or authenticate the terminal device. In this way, the network device does not need to acquire the target information of the terminal device again, which saves signaling overhead and improves resource utilization.

Figure 4:
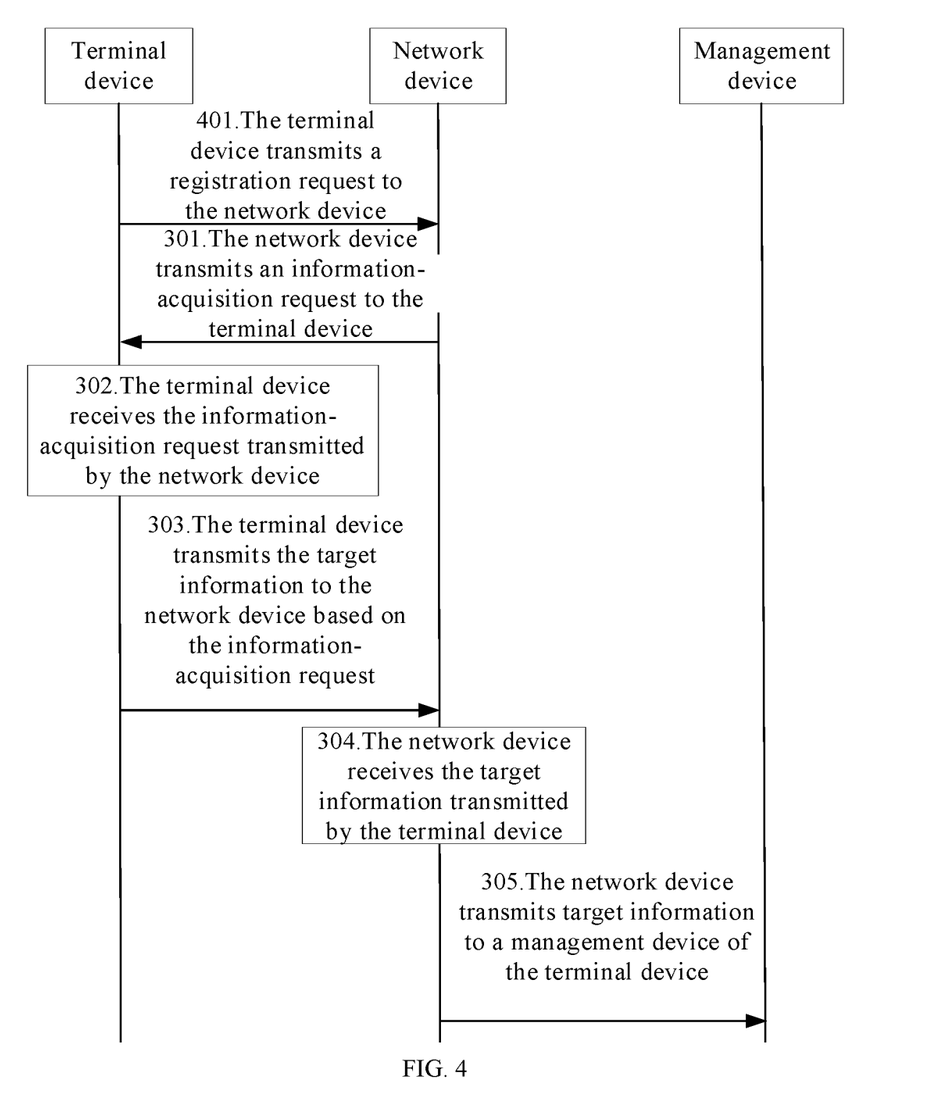
FIG. 4 is flowchart of a target information acquisition method according to some exemplary embodiments of the present disclosure.

For example, as shown in FIG. 4, before operation 301, the method further includes operation 401.

At operation 401, the terminal device transmits the registration request to the network device.

After the terminal device transmits the registration request to the network device, if the network device determines to perform authentication or authorization on the terminal device, the network device performs operation 301.

It should be noted that, this embodiment of the present disclosure only takes the network device as an example to illustrate. In another embodiment, the network device is a network element for AMF, the terminal device registers with the network element for AMF, and the network element for AMF transmits the information-acquisition request to the terminal device.

In another some embodiments, the network device transmits the information acquisition request to the terminal device according to a session-establishment request or a session-modification request transmitted by the terminal device.

In a first manner, each time the network device receives the session-establishment request or the session-modification request transmitted by the terminal device, it transmits the information-acquisition request to the terminal device.

The session-establishment request is configured to indicate the terminal device to request the network device to establish a PDU session that meets a target condition, and the session-modification request is configured to indicate the terminal device to request the network device to modify the PDU session that meets the target condition. The PDU session that meets the target condition is a session corresponding to a preset data network name (DNN) or a PDU session corresponding to a preset network slice identifier.

In embodiments of the present disclosure, the terminal device transmits the session-establishment request or the session-modification request to the network device, so as to request the network device to establish the PDU session that meets the target condition or modify the PDU session that meets the target condition. After receiving the session-establishment request or the session-modification request, the network device may determine to perform authentication or authorization on the terminal device. Thus, each time receiving the session-establishment request or the session-modification request transmitted by the terminal device, the network device transmits the information-acquisition request to the terminal device.

The network device in embodiments of the present disclosure acquires the target information of the terminal device each time receiving the session-establishment request or the session-modification request transmitted by the terminal device, ensuring that the network device may authenticate or authorize the terminal device each time, and improving security of communication with the terminal device.

In a second manner, after the network device receives the session-establishment request or the session-modification request transmitted by the terminal device for the first time, it transmits the information-acquisition request to the terminal device.

In embodiments of the present disclosure, the terminal device transmits the session-establishment request or the session-modification request to the network device for many times, and the network device transmits the information-acquisition request to the terminal device after receiving the session-establishment request or the session-modification request transmitted by the terminal device for the first time. Subsequently, when the terminal device retransmits the session-establishment request or the session-modification request, the network device does not need to retransmit the information-acquisition request to the terminal device to acquire the target information of the terminal device.

In embodiments of the present disclosure, after the network device receives the session-establishment request or the session-modification request transmitted by the terminal device for the first time, it transmits the information-acquisition request to acquire the target information of the terminal device, and subsequently authorizes or authenticates the terminal device. When the network device receives the session-establishment request or the session-modification request of the terminal device again, it does not need to authorize or authenticate the terminal device. In this way, the network device does not need to acquire the target information of the terminal device again, which saves signaling overhead and improves resource utilization.

Figure 5:
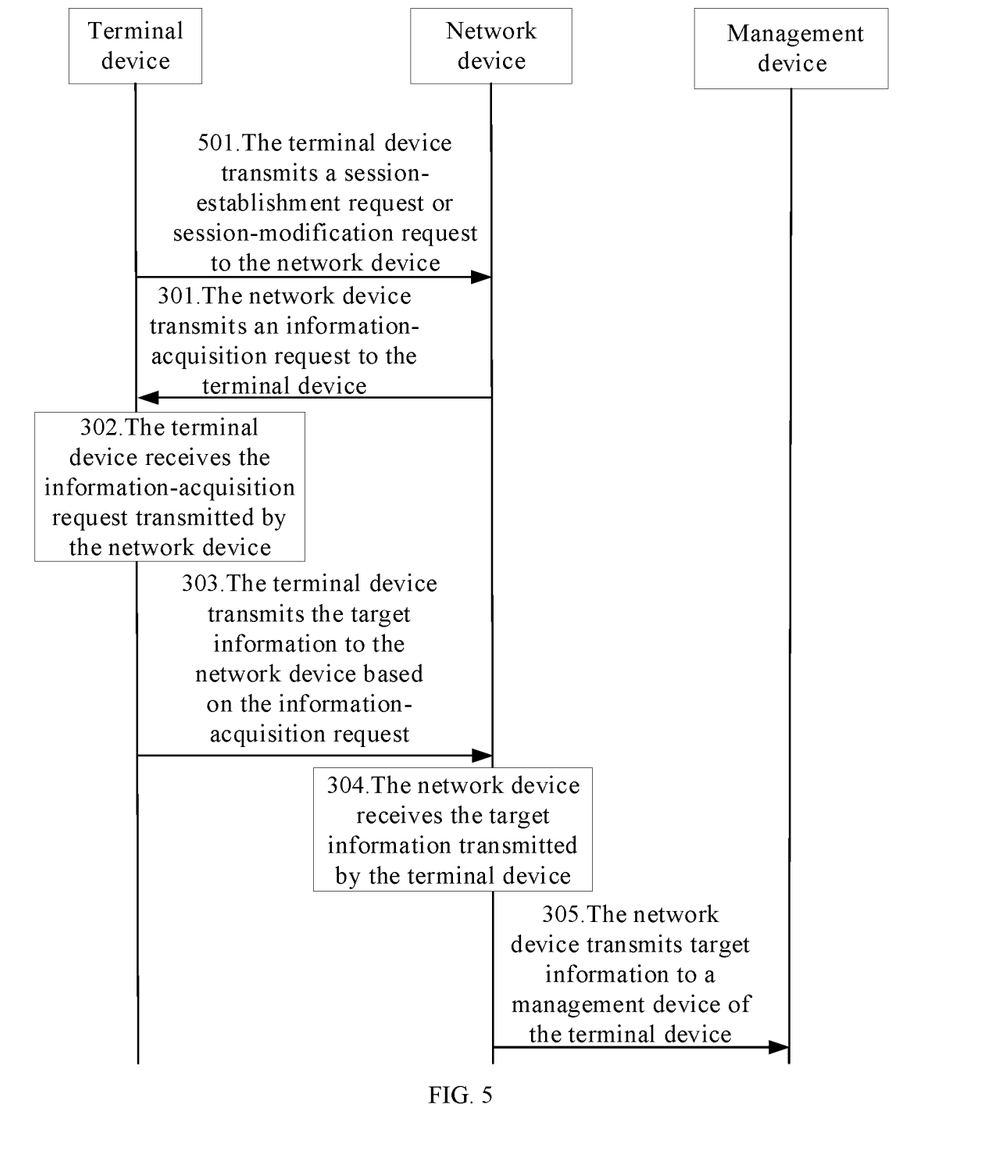
FIG. 5 is flowchart of a target information acquisition method according to some exemplary embodiments of the present disclosure.

For example, as shown in FIG. 5, before operation 301, the method also includes operation 501.

At operation 501, the terminal device transmits the session-establishment request or the session-modification request to the network device.

After the terminal device transmits the session-establishment request or the session-modification request to the network device, the network device may determine that it needs to authorize the terminal device based on the session-establishment request or the session-modification request, then the network device performs operation 301.

It should be noted that, the network device performing operation 301 is taken as an example in embodiments of the present disclosure. In another embodiment, the network device is the network element for SMF, and the terminal device requests the network element for SMF to establish or modify the PDU session that meets the target condition, and the network element for SMF transmits the information-acquisition request to the terminal device.

In a possible implementation, interaction information between the network element for SMF and the terminal device needs to be transparently transmitted through the network element for AMF. That is, the network element for AMF has a forwarding function. The interactive information between the network element for SMF and the terminal device needs to be forwarded through the network element for AMF.

It should be noted that, embodiments of the present disclosure only take an example that the network device determines to transmit the information-acquisition request to the terminal device according to the session-establishment request or the session-modification request transmitted by the terminal device. In another embodiment, after receiving the session-establishment request or the session-modification request transmitted by the terminal device, the network device first determines whether it has acquired an authentication result or an authorization result for the terminal device. If the network device has acquired the authorization result or the authentication result of the terminal device, it does not transmit the information-acquisition request to the terminal device to authorize or authenticate the terminal device. If the network device does not acquire the authentication result or the authorization result for the terminal device, it will transmit the information-acquisition request to the terminal device.

In some embodiments, the network device is the network element for SMF, and the network element for SMF determines whether to acquire the authorization result or the authentication result from the network element for AMF, and then determines whether to transmit the information-acquisition request to the terminal device. The network element for AMF determines to transmit information-acquisition request to the terminal device according to the registration request transmitted by the terminal device, so as to authenticate or authorize the terminal device according to the acquired target information of the terminal device, and acquire the authorization result or the authentication result of the terminal device.

In another some embodiments, the network device transmits the information-acquisition request to the terminal device in response to a preset time point being reached.

The preset time point is set in the network device. The terminal device needs to be authorized or authenticated in response to the preset time point being reached, and thus, the network device transmits the information-acquisition request to the terminal device to acquire the target information of the terminal device.

The preset time point is set by the network device, the operator, or other manners.

The network device may set one or more preset time points. Each time one preset time point is reached, the network device transmits the information-acquisition request to the terminal device.

At operation 302, the terminal device receives the information-acquisition request transmitted by the network device.

At operation 303, the terminal device transmits the target information to the network device based on the information-acquisition request.

In embodiments of the present disclosure, in response to the network device transmitting the information-acquisition request to the terminal device, the terminal device may receive the information-acquisition request transmitted by the network device, determine that the network device needs to acquire the target information of the terminal device, and then transmits the target information to the network device based on the information-acquisition request.

The target information is used by a management device to authenticate or authorize the terminal device.

In some embodiments, the target information includes at least one of an identifier, a serial number, pilot information, manufacturer information, and a device-type of the terminal device.

All the target information may indicate the terminal device. The identifier of the terminal device is an ID (identity document) of the terminal device or other identifiers. The serial number of the terminal device is a number marked by a manufacturer during production of the terminal device. For example, the serial number of the terminal device is marked according to production sequence of the terminal device, or in other ways. The pilot information of the terminal device is a user identifier for logging in the terminal device. The manufacturer information of the terminal device is manufacturer information of the terminal device. According to the manufacturer information, the manufacturer of the terminal device may be determined. The device-type of the terminal device is a type of the terminal device.

In some embodiments, when the terminal device is an unmanned aerial vehicle device, the device-type is a type of unmanned aerial vehicle device. For example, the device-type includes an unmanned aerial vehicle with fixed wings, an unmanned aerial vehicle with rotor wings, or an unmanned aerial vehicle with umbrella wings, etc.

At operation 304, the network device receives the target information transmitted by the terminal device.

At operation 305, the network device transmits target information to a management device of the terminal device.

In embodiments of the present disclosure, the network device transmits the received target information to the management device, and the management device may authenticate or authorize the terminal device according to the target information.

The management device is the UTM, the USS or other devices with a management function. The UTM or USS may authorize or authenticate the terminal device to determine the authorization result or the authentication result of the terminal device.

In some embodiments, the network device transmits the authorization request carrying the target information to the terminal device, or the network device transmits the authentication request carrying the target information to the terminal device.

It should be noted that, embodiments of the present disclosure only take an example that the network device transmits the information-acquisition request to the terminal device once. In another embodiment, after the network device transmits the information-acquisition request to the terminal device, it retransmits the information-acquisition request to the terminal device every a reference interval, and continues to perform operations 302-305.

The reference interval is set by the network device, the operator, or other manners. For example, the reference interval is 10 seconds, 20 seconds, or other values.

In embodiments of the present disclosure, after receiving the target information of the terminal device, the management device may authorize or authenticate the terminal device based on the target information, and determine the authorization result or the authentication result.

After determining the authorization result or the authentication result, the management device transmits the authorization result or the authentication result to the network device, and then the network device transmits the authorization result or the authentication result to the terminal device.

It should be noted that, embodiments of the present disclosure only take the network device as network element for AMF or the network element for SMF as an example to illustrate. In another embodiment, the network device also includes a network element for unmanned aerial vehicle management function. The network element for AMF or the network element for SMF transmits the target information to the network element for unmanned aerial vehicle management function, and then the network element for unmanned aerial vehicle management function transmits the target information to the management device.

Embodiments of the present disclosure provide a solution for acquiring the target information for authentication or authorization. On a premise that the network device has transmitted an information-acquisition request to the terminal device, the terminal device transmits the target information for authentication or authorization, preventing repeated transmission of the target information since the terminal device actively transmits the target information, reducing resource waste, and improving resource utilization.

Figure 6:
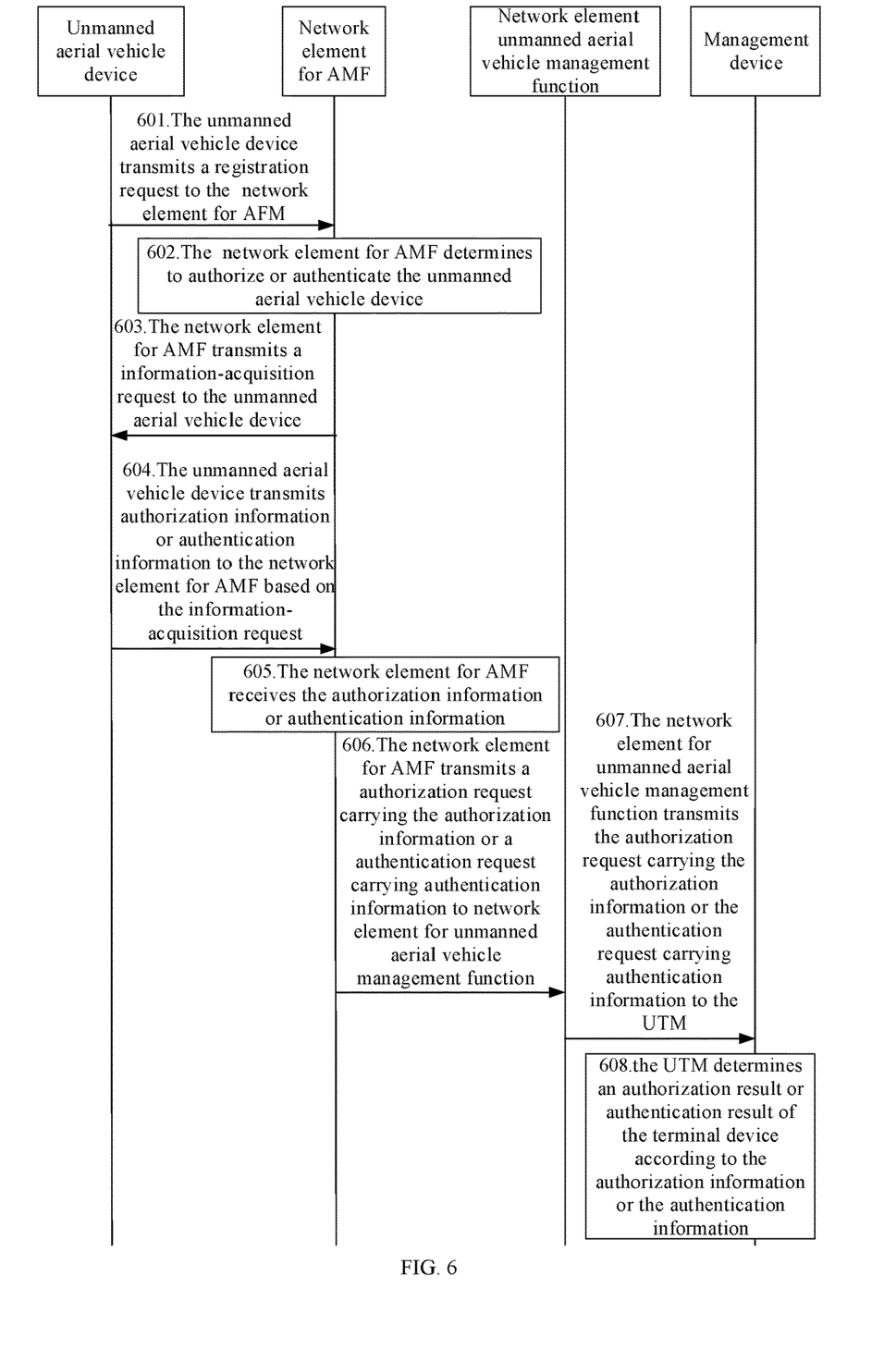
FIG. 6 is flowchart of a target information acquisition method according to some exemplary embodiments of the present disclosure.

In some embodiments, the terminal device is an unmanned aerial vehicle device, the network device is an network element for AMF, and the management device of the unmanned aerial vehicle device is an UTM, and the UTM is connected to the network element for unmanned aerial vehicle management function. The solution of performing authorization or authentication through a registration request in the above FIG. 3 may be implemented as shown in FIG. 6, and the method includes following operations.

At operation 601, the unmanned aerial vehicle device transmits a registration request to the network element for AMF.

At operation 602, the network element for AMF determines that it needs to authorize or authenticate the unmanned aerial vehicle device.

At operation 603, the network element for AMF transmits an information-acquisition request to the unmanned aerial vehicle device.

At operation 604, the unmanned aerial vehicle device transmits authorization information or the authentication information to the network element for AMF based on the information-acquisition request.

At operation 605, the network element for AMF receives the authorization information or the authentication information.

At operation 606, the network element for AMF transmits an authorization request carrying the authorization information or an authentication request carrying the authentication information to the network element for unmanned aerial vehicle management function.

At operation 607, the network element for unmanned aerial vehicle management function transmits the authorization request carrying the authorization information or the authentication request carrying the authentication information to the UTM.

At operation 608, the UTM determines an authorization result or authentication result of the terminal device according to the authorization information or the authentication information.

Figure 7:
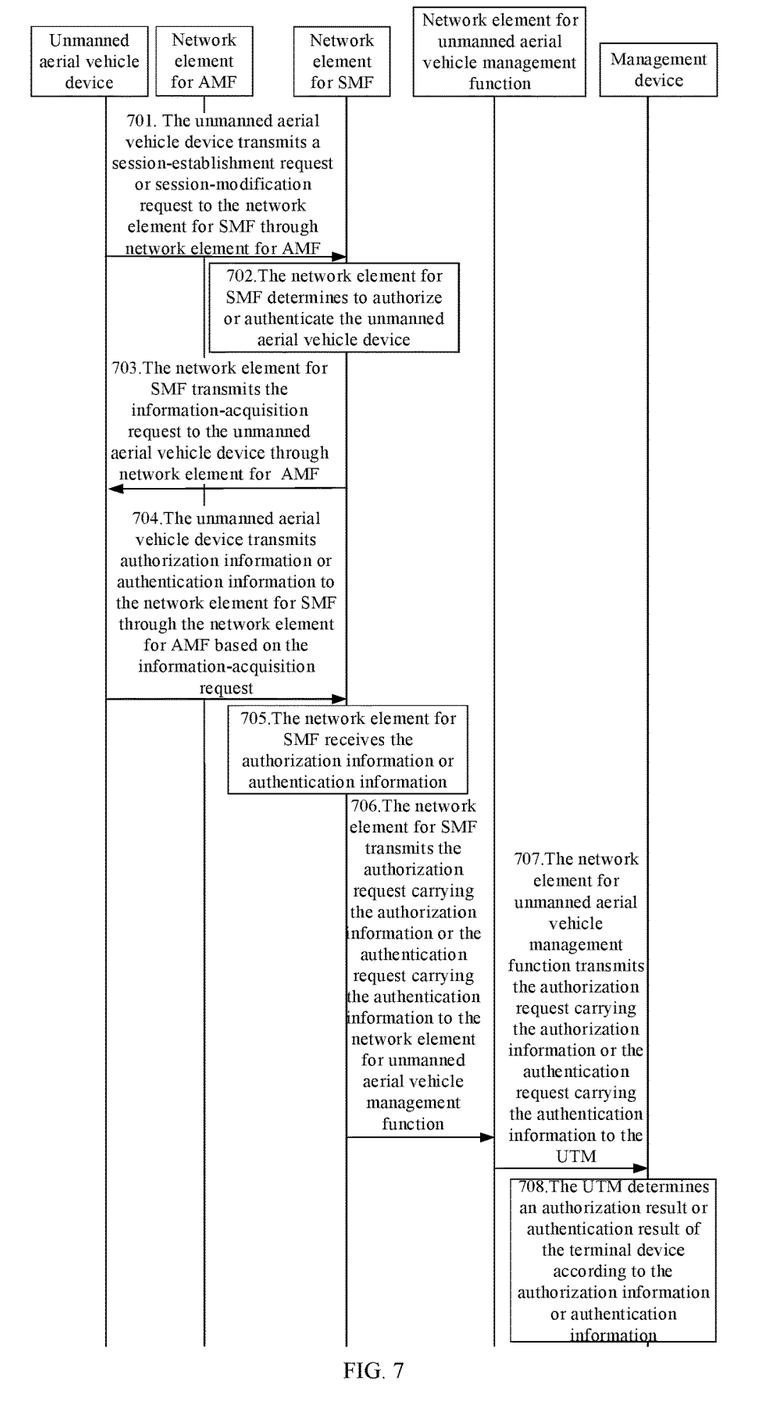
FIG. 7 is flowchart of a target information acquisition method according to some exemplary embodiments of the present disclosure.

In another some embodiments, the terminal device is an unmanned aerial vehicle device, the network device is a network element for SMF, and the management device of the unmanned aerial vehicle device is an UTM, and the UTM is connected to the network element for unmanned aerial vehicle management function. The solution of performing authorization or authentication through a session-establishment request or a session-modification request in FIG. 3 may be implemented as shown in FIG. 7. The method includes following operations.

At operation 701, the unmanned aerial vehicle device transmits the session-establishment request or the session-modification request to the network element for SMF through the network element for AMF.

At operation 702, the network element for SMF determines that it needs to authorize or authenticate the unmanned aerial vehicle device.

At operation 703, the network element for SMF transmits an information-acquisition request to the unmanned aerial vehicle device through the network element for AMF.

At operation 704, the unmanned aerial vehicle device transmits authorization information or authentication information to the network element for SMF through the network element for AMF based on the information-acquisition request.

At operation 705, the network element for SMF receives the authorization information or the authentication information.

At operation 706, the network element for SMF transmits an authorization request carrying the authorization information or an authentication request carrying the authentication information to the network element for unmanned aerial vehicle management function.

At operation 707, the network element for unmanned aerial vehicle management function transmits the authorization request carrying the authorization information or the authentication request carrying the authentication information to the UTM.

At operation 708, the UTM determines an authorization result or authentication result of the terminal device according to the authorization information or authentication information.

Figure 8:
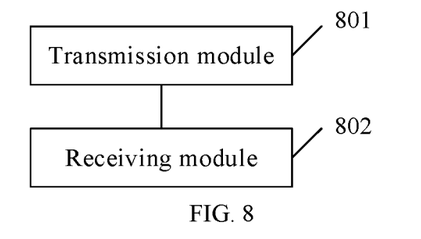
FIG. 8 is a block diagram of a target information acquisition apparatus according to some exemplary embodiments of the present disclosure.

FIG. 8 is a block diagram of a target information acquisition apparatus according to some exemplary embodiments of the present disclosure. The apparatus is applied in a network device. As shown in FIG. 8, the apparatus includes the following.

A transmission module 801 is configured to transmit a information-acquisition request to a terminal device configured to indicate the terminal device to transmit the target information.

A receiving module 802 is configured to receive the target information transmitted by the terminal device.

The transmission module 801 is configured to transmit the target information to a management device of the terminal device, and the management device is configured to authenticate or authorize the terminal device according to the target information.

Embodiments of the present disclosure provide a solution for acquiring the target information for authentication or authorization. On a premise that the network device has transmitted the information-acquisition request to the terminal device, the terminal device transmits the target information for authentication or authorization, preventing repeated transmission of the target information since the terminal device actively transmits the target information, reducing resource waste, and improving resource utilization.

In some embodiments, the transmission module 801 is configured to transmit the information-acquisition request to the terminal device each time receiving a registration request transmitted by the terminal device, or transmit the information-acquisition request to the terminal device after receiving the registration request transmitted by the terminal device for the first time.

The registration request is configured to indicate the terminal device to register with the network device.

In another some embodiments, the network device is a network element for AMF.

In another some embodiments, the transmission module 801 is configured to transmit the information-acquisition request to the terminal device each time receiving a session-establishment request or a session-modification request transmitted by the terminal device, or transmit the information-acquisition request to the terminal device after receiving the session establishment request or the session-modification request transmitted by the terminal device for the first time.

The session-establishment request is configured to indicate the terminal device to request the network device to establish the PDU session that meets a target condition, and the session-modification request is configured to indicate the terminal device to request the network device to modify the PDU session that meets the target condition.

In another some embodiments, the PDU session that meets the target condition is a PDU session corresponding to the DNN, or a PDU session corresponding to the preset network slice identifier.

In another some embodiments, the network device is a network element for SMF.

In another some embodiments, the transmission module 801 is configured to retransmit the information-acquisition request to the terminal device every a reference interval.

In another some embodiments, the transmission module 801 is configured to retransmit the information-acquisition request to the terminal device in response to the preset time point being reached.

In another some embodiments, the target information includes at least one of an identifier, a serial number, pilot information, manufacturer information, a device-type, and a weight of the terminal device.

In another some embodiments, the terminal device is an unmanned aerial vehicle device.

Figure 9:
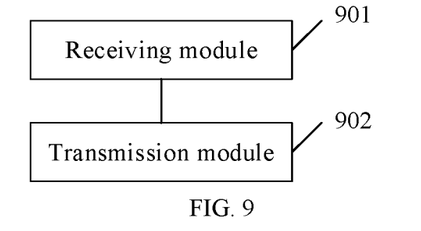
FIG. 9 is a block diagram of a target information transmission apparatus according to some exemplary embodiments of the present disclosure.

FIG. 9 is a block diagram of a target information transmission apparatus according to some exemplary embodiments of the present disclosure. The apparatus is applied in a terminal device. As shown in FIG. 9, the apparatus includes the following.

A receiving module 901 is configured to receive an information-acquisition request transmitted by the network device, the information-acquisition request is configured to indicate the terminal device to transmit target information of the terminal device, and the target information is configured to authenticate or authorize the terminal device.

A transmission module 902 is configured to transmit the target information to the network device based on the information-acquisition request.

Embodiments of the present disclosure provide a solution for acquiring the target information for authentication or authorization. On a premise that the network device has transmitted the information-acquisition request to the terminal device, the terminal device transmits the target information for authentication or authorization, preventing repeated transmission of the target information since the terminal device actively transmits the target information, reducing resource waste, and improving resource utilization.

In some embodiments, the transmission module 902 is configured to transmit the registration request to the network device, and the registration request is configured to indicate the terminal device to register with the network device.

In another some embodiments, the transmission module 902 is configured to transmit a session-establishment request or session-modification request to the network device.

The session-establishment request is configured to indicate the terminal device to request the network device to establish the PDU session that meets a target condition, and the session-modification request is configured to indicate the terminal device to request the network device to modify the PDU session that meets the target condition.

In another some embodiments, the PDU session that meets the target condition is a PDU session corresponding to the preset DNN, or a PDU session corresponding to the preset network slice identifier.

In another some embodiments, the target information includes at least one of an identifier, a serial number, pilot information, manufacturer information, a device-type, and a weight of the terminal device.

In another some embodiments, the terminal device is an unmanned aerial vehicle device.

Figure 10:
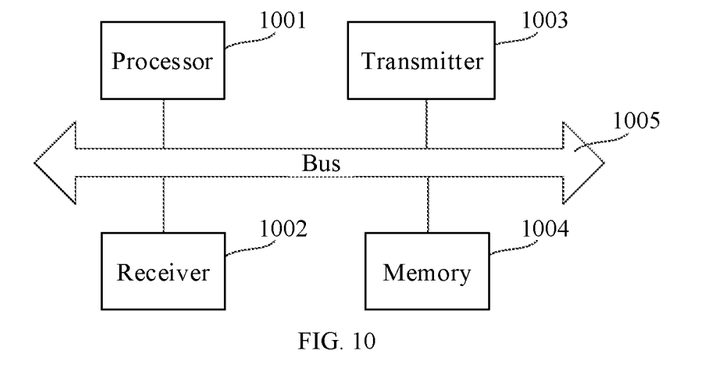
FIG. 10 shows a structural schematic diagram of a communication device according to embodiments of the present disclosure.

FIG. 10 shows a structural schematic diagram of a communication device according to embodiments of the present disclosure. The communication device includes a processor 1001, a receiver 1002, a transmitter 1003, a memory 1004, and a bus 1005.

The processor 1001 includes one or more processing cores. The processor 1001 executes various functional applications and information processing by running software programs and modules.

The receiver 1002 and the transmitter 1003 may be implemented as a communication component, which may be a communication chip.

The memory 1004 is connected to the processor 1001 through the bus 1005.

The memory 1004 may be configured to store at least one program code, and the processor 1001 may be configured to execute the at least one program code to implement various operations in above method embodiments.

In addition, the communication device may be a terminal device or a network device. Memory 1004 may be any type of volatile, non-volatile storage device or their combination. Volatile or non-volatile storage devices include but are not limited to: a disk, an optical disk, an electrically erasable programmable read-only memory (EEPROM), an erasable programmable read-only memory (EPROM), a static ready access memory (SRAM), a read-only memory (ROM), a magnetic memory, a flash memory, a programmable read only memory (PROM).

In some exemplary embodiments, a computer-readable storage medium is also provided and stores an executable program code. The executable program code is loaded and executed by a processor to implement the target information acquisition method or the target information transmission method in the communication device according to the above method embodiments.

In some exemplary embodiments, a chip is also provided and includes a programmable logic circuit and/or program instructions. When the chip runs on a terminal device or network device, it is configured to implement the above target information acquisition method or the above target information transmission method.

In some exemplary embodiments, a computer program product is also provided.

When the computer program product is executed by a terminal device or a network device, it is configured to implement the above target information acquisition method or the above target information transmission method.

Those skilled may understand that, all or some of the operations implementing the above embodiments may be performed by a hardware, or may be performed by indicating a relevant hardware through a program. The program may be stored in a computer-readable storage medium, which may be a read-only memory, a disk, or an optical disk.

Above description are only alternative embodiments of the present disclosure, but does not limit the present disclosure. Any modification, equivalent replacement, and improvement, etc. within spirit and principle of the present disclosure should be included in the protection scope of the present disclosure.

What is claimed is:

1. A target information acquisition method in a network device, comprising:
   transmitting an information-acquisition request to a terminal device, the information-acquisition request indicating the terminal device to transmit target information;
   receiving the target information transmitted by the terminal device; and
   transmitting the target information to a management device of the terminal device, the management device authenticating or authorizing the terminal device according to the target information;
   wherein the transmitting an information-acquisition request to a terminal device, comprises:
   transmitting the information-acquisition request to the terminal device after receiving the session-establishment request or the session-modification request transmitted by the terminal device;
   wherein the session-establishment request is used to indicate the terminal device to request the network device to establish a protocol data unit (PDU) session that meets a target condition, and the session-modification request is used to indicate the terminal device to request the network device to modify the PDU session that meets the target condition.

2. The method as claimed in claim 1, wherein the transmitting an information-acquisition request to a terminal device, comprises:
   transmitting the information-acquisition request to the terminal device after receiving registration request transmitted by the terminal device;
   wherein the registration request is used to indicate the terminal device to register with the network device.

3. The method as claimed in claim 2, wherein the network device is a network element for access and mobility management function (AMF).

4. The method as claimed in claim 1, wherein the PDU session that meets the target condition is a PDU session corresponding to a preset data network name (DNN), or a PDU session corresponding to a preset network slice identifier.

5. The method as claimed in claim 1, wherein the network device is a network element for session management function (SMF).

6. The method as claimed in claim 1, wherein after the transmitting an information-acquisition request to a terminal device, the method further comprises:
   retransmitting the information-acquisition request to the terminal device every a reference interval.

7. The method as claimed in claim 1, wherein the transmitting an information-acquisition request to a terminal device, comprises:
   transmitting the information-acquisition request to the terminal device in response to a preset time point being reached.

8. The method as claimed in claim 1, wherein the target information comprises at least one of an identifier, a serial number, pilot information, manufacturer information, a device-type, and a weight of the terminal device.

9. The method as claimed in claim 1, wherein the terminal device is an unmanned aerial vehicle device.

10. A target information transmission method in a terminal device, comprising:
    receiving an information-acquisition request transmitted by a network device, the information-acquisition request indicating the terminal device to transmit target information of the terminal device, and the target information authenticating or authorizing the terminal device; and
    transmitting the target information to the network device based on the information-acquisition request;
    wherein before the receiving an information-acquisition request transmitted by a network device, the method comprises:
    transmitting a session-establishment request or a session-modification request to the network device;
    wherein the session-establishment request is used to indicate the terminal device to request the network device to establish a protocol data unit (PDU) session that meets a target condition, and the session-modification request is used to indicate the terminal device to request the network device to modify the PDU session that meets the target condition.

11. The method as claimed in claim 10, wherein before the receiving an information-acquisition request transmitted by a network device, the method comprises:
    transmitting a registration request to the network device, the registration request indicating the terminal device to register with the network device.

12. The method as claimed in claim 10, wherein the PDU session that meets the target condition is a PDU session corresponding to a preset data network name (DNN), or a PDU session corresponding to a preset network slice identifier.

13. The method as claimed in claim 10, wherein the target information comprises at least one of an identifier, a serial number, pilot information, manufacturer information, a device-type, and a weight of the terminal device.

14. The method as claimed in claim 10, wherein the terminal device is an unmanned aerial vehicle device.

15. A terminal device, comprising:
    a processor;
    a transceiver, connected to the processor;
    a memory, configured to store a program code executed by the processor;
    wherein the processor is configured to load and execute the program code to implement a target information transmission method, comprising:
    receiving an information-acquisition request transmitted by a network device, the information-acquisition request indicating the terminal device to transmit target information of the terminal device, and the target information authenticating or authorizing the terminal device; and
    transmitting the target information to the network device based on the information-acquisition request,
    before the receiving an information-acquisition request transmitted by a network device, the method comprises:

transmitting a session-establishment request or a session-modification request to the network device;

wherein the session-establishment request is used to indicate the terminal device to request the network device to establish a protocol data unit (PDU) session that meets a target condition, and the session-modification request is used to indicate the terminal device to request the network device to modify the PDU session that meets the target condition.

16. The terminal device as claimed in claim 15, wherein before the receiving an information-acquisition request transmitted by a network device, the method comprises:

transmitting a registration request to the network device, the registration request indicating the terminal device to register with the network device.

17. The terminal device as claimed in claim 15, wherein the PDU session that meets the target condition is a PDU session corresponding to a preset data network name (DNN), or a PDU session corresponding to a preset network slice identifier.

* * * * *